United States Patent [19]
Wajs

[11] 4,229,273
[45] Oct. 21, 1980

[54] METHOD FOR PREPARING SILICONE GRAFT COPOLYMERS

[75] Inventor: Georges H. Wajs, Ivry, France

[73] Assignee: Essilor International Compagnie Generale d'Optique, Joinville le Pont, France

[21] Appl. No.: 41,734

[22] Filed: May 23, 1979

Related U.S. Application Data

[63] Continuation of Ser. No. 889,640, Mar. 24, 1978, abandoned.

[30] Foreign Application Priority Data

Mar. 31, 1977 [FR] France ............................... 77 09766

[51] Int. Cl.³ .................... C08L 51/08; C08F 2/46; B29D 11/00
[52] U.S. Cl. .................................. 204/159.13; 264/1; 351/160 H; 525/478; 525/479
[58] Field of Search ............... 204/159.13, 1; 351/160; 260/827

[56] References Cited

U.S. PATENT DOCUMENTS 3,959,102   5/1976   Wajs et al. ...................... 204/159.13

*Primary Examiner*—Wilbert J. Briggs, Sr.

[57] ABSTRACT

The invention relates to the preparation of graft copolymers from silicones. The method comprises subjecting an article such as a contact lens previously moulded from silicone resins to an UV irradiation step with radiations of wave-length from 1800 to 4000 angströms, in the presence of oxygen, and in a subsequent step contacting said article with an unsaturated monomer compound at a temperature sufficient to ensure the grafting of said compound on the silicone resin.

14 Claims, No Drawings

METHOD FOR PREPARING SILICONE GRAFT COPOLYMERS

This is a continuation of application Ser. No. 889,640, filed Mar. 24, 1978, now abandoned.

BACKGROUND OF THE INVENTION

The present invention relates to the preparation of silicone containing graft copolymers, and more specifically to the preparation of graft copolymers of silicones and hydrophilic monomers, such as the copolymers used in ophtalmology, i.e. in the manufacture of contact lenses.

These copolymers made from a base material of silicones are known to constitute a material of high value for that use. Through them it has been possible to take benefit of the mechanical and optical qualities of the silicone resins, in particular of their flexibility and their transparency, while avoiding the drawbacks resulting from their natural hydrophobia. This was obtained by grafting on the silicone resins monomers which are able to endow them with a hydrophilous character which is essential for preventing rupture of the tear or lachrymal fluid film which must be continuously present both underneath the contact lens so as to cover the cornea and above the contact lens so that the latter may be tolerated by the user.

After the valuability of graft copolymers of silicones and hydrophilic monomers as a material for the manufacture of contact lenses was ascertained, difficulties appeared nevertheless in the way how to obtain such copolymers. The difficulties encountered result for some of them from the fact that silicones which are organosilicic polymers of polysiloxanes often react differently from other types of common polymers when subjected to the various conventional methods of grafting. But furthermore a great number of these methods have to be banished when the purpose is to obtain a material suitable for the manufacture of contact lenses, either because they have a far too great effect on the basic mechanical properties of the silicones, or because they destroy the transparency due to the introduction of extra compounds beside the polymers for inducing the graft copolymerization.

A first solution of these problems was found in initiating a radiochemical grafting through the use of ionizing radiations such as X rays or gamma rays according to French Pat. No. 1,526,934 or to U.S. Pat. No. 3,700,573. But when performing these techniques in practice, one is then faced with other difficulties in connection with the precautions prescribed in all manipulations involving radioactive sources. The ionizing irradiation which is performed on previously cast lenses must be carried out in specially approved protected plants by a specially trained staff, which leads to significant complications in conceiving a manufacturing equipment train.

It is an object of the present invention to resolve the difficulties aforesaid by proposing a method which is easy to practice and which conciliates the requirements of an industrial manufacturing process with the production of copolymers with properties specially adapted to their use in contact lenses.

This is attained in a method for preparing silicone graft copolymers which essentially comprise subjecting an article previously cast from a silicone resin to an ultraviolet radiation having a wave-length from 1800 to 4000 angströms in the presence of oxygen and in a subsequent step bringing said article in contact with an unsaturated compound so as to induce the grafting of said compound on the silicone resin.

The invention also relates to the articles made of silicone graft copolymers which are obtained by said method and to the specially valuable use of said method in the manufacture of contact lenses.

The ultraviolet radiation used in this method is a non ionizing radiation, which is in accordance with the limits of the range from 1800 to 4000 angströms assigned to the wave-length. In practice this wave-length is preferably within the range from 2000 to 3000 angströms. The article treated is exposed to this radiation in the presence of oxygen, the latter being either pure or contained in a mixture. It may especially be irradiated in the presence of the oxygen contained in atmospheric air. It appears that one finds an advantage to operate in the air for several reasons. On one hand, air absorbs radiations having low wave-lengths, i.e. wave-lengths lower than 1800 angströms, which might be emitted by the UV sources used and would interfere by their ionizing effect with the UV ray ranges of higher wave-lengths the use of which is essential for performing the invention. On another hand furthermore, the atmospheric air has proved to have a proper specific beneficial effect on the results of the subsequent grafting reaction. It is remarkable that UV irradiation in the presence of oxygen leads to an efficient grafting while preserving the qualities of the silicones, whereas the known properties of silicones would have rather led to fear that the resin would be damaged and would fade or turn yellow, thus being rendered unconvenient for any use requiring transparency.

The unsaturated compound which is grafted on the silicone resin is preferably a hydrophilic monomer such as in particular N-vinylpyrrolidone which is specially convenient in connection with contact lenses. However other ethylenically unsaturated monomers may also be used, such as vinylic or acrylic monomers, when known in other fields as having hydrophilic properties. In fact, for grafting on a silicone resin intended for use as a base material in a contact lens, preferred hydrophilic monomers are those compounds having a pyrrolidone ring wherein the nitrogen atom of the heterocyclic ring carries as a substituent an hydrocarbon radical including an ethylenically unsaturated group. The ethylenic double bond may be included in an alkenyl radical such as vinyl and allyl radicals, but it can also be linked at the chain end of an alkyl radical, for instance when the latter is terminated by an ester group from an unsaturated acid such as acrylic or methacrylic acid.

Generally speaking silicone resins are constituted of organosilicic polymers the chain of which comprises a major part of units having formula

wherein A and B designate any hydrocarbon radicals which may be identical to or different from each other and which may possibly vary from one unit to another in the chain. On another hand, it should be understood here that the general term of polymer is meant to include the specific case of copolymers.

Within the scope of the present invention, it is preferred to use resins as aforesaid which are obtained by polymerization from mixtures comprising essentially siloxanic polymers the chains of which are terminated by vinyl groups and in which all the silicon atoms have two substituent radicals each selected from saturated aliphatic hydrocarbons and aromatic hydrocarbons, each silicon atom preferably carrying two identical or different alkyl radicals comprising from 1 to 4 carbon atoms, for instance two methyl radicals, but further comprising in admixture therewith an hydrogeno-organopolysiloxane the formula of which comprises Si-H bonds.

Resins as aforesaid are known not only from French Pat. No. 73.28665 filed on Aug. 6, 1973 by the Applicant, but also from U.S. Pat. Nos. 3,284,406 and 3,436,366. Their polymerization is obtained in a conventional way by means of a platinum catalyst which may be of any type able to promote the reaction between hydrogen atoms bonded to silicon atoms and vinyl groups bonded to silicon atoms. Most often such catalysts are selected from finely divided metal platinum and soluble platinum compounds such as chloroplatinic acid, platinum complexes formed in hydrocarbons, and platinum alcoholates.

According to a preferred embodiment of the invention, the silicone resin onto which grafting will then be performed, is obtained and directly moulded under the shape of contact lenses by copolymerizing a mixture comprising the following components, assuming R designates any alkyl radical comprising from 1 to 4 carbon atoms and the values of the various R in one formula and in the various components of one composition may be different from each other, while all R are preferably methyl groups:

100 parts by weight of a dialkylpolysiloxane having formula $R_2(CH_2=CH)SiO—(R_2SiO)_n—Si(CH=CH_2)R_2$, wherein n is an integral number such that the viscosity of the polymer ranges from 300 to 800,000 and preferably from 500 to 5,000 cPo at 25° C.;

from 25 to 40 parts by weight of a copolymer constituted of units having formulae $R_3SiO_{0.5}$, $R(CH_2=CH)SiO$ and $SiO_2$ and containing vinyl groups in a proportion from 1.5 to 3.5% with respect to its own weight, the ratio of the total number of $R_3SiO_{0.5}$ and $R(CH_2=CH)SiO$ units to the number of $SiO_2$ units ranging from 0.5 to 1.2;

an hydrogenoalkylpolysiloxane containing $R_2HSiO_{0.5}$ groups in an amount sufficient to provide from 0.8 to 1.9, and preferably from 0.9 to 1.7 SiH bonds for one $SiCH=CH_2$ bond in the mixture;

a platinum containing catalyst, or preferably from 0.0009 to 0.005 parts by weight of platinum in the form of a solution in an alcohol comprising from 1 to 15 carbon atoms.

The mixture or composition constituted of these components may be moulded and cured into a shaped article made of silicone resin under conditions which are conventional per se, for instance by heating at a temperature within the range from 80° to 160° C. for a time interval from 1 to 5 hours.

For the purpose of grafting hydrophilic units, according to the invention, the moulded article is exposed to an UV irradiation which, within the range already indicated for the wave-length, may be constituted in particular by the UV rays emitted by the commonly used mercury vapour lamps or by the radiations produced together with discharges in high frequency plasmas. The presence of oxygen is ascertained when, according to the easiest procedure, irradiation is operated in free atmospheric air. Performing the treatment in practice is thus specially simple. The irradiation dose may be controlled through the light intensity received by the article and the irradiation time period so as to obtain subsequently the grafting rate desired. In the case of contact lenses it is desirable to accomplish grafting rates within the range involving from 1 to 25% by weight of hydrophilic compound, especially of the heterocyclic type such as polyvinylpyrrolidone, grafted onto the complementary amount up to 100% by weight (i.e. an amount from 75 to 99%) of silicone resins of the type already defined. The irradiation doses received by the articles processed may correspond to an exposure to powers within the range for instance from 100 to 1000 mW/cm$^2$ during a time period about from 5 seconds to 30 minutes. Preferably these doses correspond to an energy within the range from 1 to 100 cal/cm$^2$.

The grafting reaction itself is accomplished in the absence of oxygen, preferably after removal of the oxygen adsorbed in the plastic. It may be effected at any temperature high enough for initiating the copolymerization reaction in which the double bonds of the unsaturated compounds to be grafted are involved, i.e. generally at any temperature within the range from 20° to 250° C., and possibly at the ambient room temperature but preferably under heating at a temperature from 120° C. to 200° C., and under nitrogen bubbling. The contacting time required is generally within the range from 5 minutes to 8 hours and most often from 10 minutes to 2 hours. The unsaturated monomer compound is used preferably in a pure state as a liquid, or possibly as a solution. However, it may also be used in a partly polymerized form. It may further contain additives, such as for instance surfactants, in a proportion lower than or equal to 5% by weight.

The silicone graft copolymer obtained after the above treatment or processing step is a flexible transparent hydrophilic material the properties of which may be further improved by an additional cross-linking treatment, consisting of a further exposure step to an ultraviolet radiation effected according to the procedure described in French Pat. No. 73.28665 (published under No. 2,240,463) or U.S. Pat. No. 3,959,102 in order to render the material lipophobic. This additional irradiation is especially useful in the case of contact lenses manufactured in accordance with the invention from a graft copolymer of a silicone resin such as hereinabove defined and vinylpyrrolidone or a similar compound.

When used for preparing a contact lens adapted to be worn on the cornea, the method of the invention comprises moulding a silicone resin composition into a substrate of generally concave-convex shape, irradiating said substrate in the presence of oxygen with a non ionizing UV radiation having a wave-length within the range from 1800 to 4000 angstroms, in the presence of oxygen, and contacting said irradiated substrate with an unsaturated compound selected from monomers having hydrophilic properties to form a graft copolymer of about 75 to 99% by weight of said silicone resin and about 1 to 25% by weight of said monomer grafted thereto. Preferably said method further comprises further irradiating said graft copolymer to cross-link said monomer units, said further irradiating being of sufficient intensity and duration to cause a sufficient amount of cross-linking of said monomer units to substantially reduce the risk of rupture of a precorneal lachrymal film, while said graft copolymer remains capable of being rendered transparent and has the optical properties necessary to function as a contact lens. In accordance with the conditions describes in the abovementioned U.S. Pat. No. 3,959,102, said irradiation is preferably carried out so as to provide a total radiation dosage of about 0.1 to 20 m rads on said graft copolymer, and may be accomplished by exposing said graft copolymer to UV light as a wave-length of about 2537 angström units and an intensity of 30,000 watts per cm$^2$ from about 4 to 16 hours.

According to a further feature of the invention, the silicone resin is advantageously admixed with an agent such as chloroplatinic acid which is effective to limit the length of the chains formed during polymerization. It has been established that such an agent, which can be supposed to reduce the length of the hydrophilic polymer units linked onto the silicone resin by the grafting reaction, results in improving the optical appearance of transparent articles such as contact lenses. The proportion of chloroplatinic acid in the polymer mixture forming the silicone resin is then preferably from 10 to 250 parts per million by weight.

The description of the invention will now be continued using typical embodiments corresponding to specific non limitative examples. In this description and in the appended claims all parts and proportions are indicated by weight unless otherwise stipulated.

EXAMPLE I

Moulds having a cavity conforming to the shape of contact lenses are filled with a silicone composition comprising:

78 g of a dimethylpolysiloxanic oil blocked at each end by an unit of formula $(CH_3)_2(CH_2=CH)SiO_{0.5}$, of viscosity 1,000 cPo at 25° C.;

25 g of a copolymer constituted of units of formulae $(CH_3)_3SiO_{0.5}$, $(CH_3)(CH_2=CH)SiO$ and $SiO_2$, respectively distributed in the numerical ratio 2.3/0.4/3.5;

5.5 g of a copolymer constituted of units of formulae $(CH_3)_2HSiO_{0.5}$ and $SiO_2$, respectively distributed in the numerical ratio 2/1;

0.001 g of platinum in soluble form of octylic alcohol.

The moulds are closed and maintained under pressure while they are heated up to 120° C. After 3 hours at this temperature the silicone resin is polymerized and the lenses are removed from the moulds. The lenses are then successively exposed in free atmospheric air to the radiation emanating from a mercury vapour quartz lamp. The lamp used is a so-called Philips OZ4 germicid lamp generating with a power of 4 W radiations at 1849 and 2537 angströms. Each lens or substrate is irradiated first for 15 minutes on its convex face, then for 15 minutes on its concave face, while positioned at a distance of 3 cm from the lamp.

The lenses are subsequently immersed in a reactor containing N-vinylpyrrolidone purified by distillation. Due to a continuous bubbling of purified nitrogen the oxygen dissolved in the liquid is removed. The whole equipment is heated up to a temperature of 130° C. for 30 minutes. The lenses are then removed from the reactor and washed with water in order to remove any non grafted vinylpyrrolidone. The grafting rate attained amounts to 4.15% by weight polyvinylpyrrolidone with respect to the initial weight of the lens.

In another experiment the grafting reaction is continued during one hour at the same temperature equal to 130° C. The grafting rate obtained is equal to 4.6% by weight of the initial weight of the lens.

EXAMPLE II

Lenses made of moulded silicone resin and and prepared in the same way as in Example I are irradiated by exposure to the radiations from the same lamp, but the conditions are varied. After a reaction step for grafting N-vinylpyrrolidone carried out during 30 minutes at 130° C. as in Example I the following grafting rates are obtaines:

for an exposure at a distance of 3 cm for 30 minutes on each face, the grafting rate is 5.3%;

for an exposure at a distance of 1.5 cm for 15 minutes on each face, the grafting rate is 6.5% (still in terms of the weight percentage with respect to the initial weight of the lens).

EXAMPLE III

The source or generator of UV rays used is a low pressure mercury vapour lamp of the type known commercially as Philips TUV, radiating a power of 15 W, having a quartz wall, and radiating at a 2537 angströms wave-length.

The lenses prepared as in Example I are processed as previously described, except that the exposure time during which the lens is subjected to UV irradiation and the time of contact with the grafting monomer are varied.

The following grafting rates are obtained, in terms of the weight percentage of polyvinylpyrrolidone with respect to the initial weight of the silicone resin from which the lenses are made:

| Exposure Time per face | Time of Contact | | |
|---|---|---|---|
| | 30 minutes | 1 hour | 2 hours |
| 15 minutes | 4 | 3.5 | 3.1 |
| 30 minutes | 5 | 4.5 | 5.6 |
| 1 hour | 7.2 | 7.3 | 7.2 |

EXAMPLE IV

Samples moulded into the shape of contact lenses are described in Example I, starting from the same silicon resin, are placed vertically in quartz supporting cells. They are irradiated on both faces simultaneously, by means of two HPK 125 lamps disposed on either side of the samples respectively, at a distance of 4 cm from their faces. The radiating power of such a lamp in the band of the 2537 angströms radiation is 8.9 W. The dose of radiation about 2537 angströms received on each face under such conditions is 500 mW/cm$^2$, that is 0.13 cal. per second per cm$^2$.

After irradiation times varying with the samples from 10 seconds to 10 minutes, these samples are contacted with N-vinylpyrrolidone monomer, under bubbling of nitrogen, at 110° C. during 30 minutes. The grafting rate is 11.2% by weight of vinylpyrrolidone with respect to the total weight of the sample for an UV irradiation time of 5 minutes. For an irradiation time of 1 minute and a time of contact between the resin and the monomer of 30 minutes at 100° C. the grafting rate is 3% by weight.

In practice, it is not profitable to increase the irradiation time to more than 10 minutes because higher times do not lead to a significant increase of the grafting rate. However, there occurs no damage to the polymers even for radiation times amounting to about 1 hour.

EXAMPLE V

Samples shaped as contact lenses are prepared as described in Example I, except that previously to the moulding step the polymer composition is admixed with 0.2% by weight of a solution containing 5 mg chloroplatinic acid per g of water.

The samples are exposed to the radiation from a HPK lamp during 5 minutes as in Example IV, and they are subsequently contacted with vinylpyrrolidone for 30 minutes at 100° C. The grafting rate is 6% by weight of polyvinylpyrrolidone with respect to the total weight of the copolymer obtained.

The flexible contact lenses thus obtained show a very good optical appearance which is evidenced in particular by a better image when examined with a frontofocometer and by an improved visual acuity with respect to the lenses of Example IV for the user wearing these lenses.

EXAMPLE VI

Using samples prepared according to the preceding Examples, tests of wettability are carried out which consist of measuring with goniometer the angle formed by a drop of water with the surface of the sample according to the method from Zisman WA described in Contact Angle Wettability and Adhesion Advance in Chemistry, Series 43, Amer. Chem. Soc., 1964, p. 15. The measurement is performed both on feeding, i.e. when the drop is deposited on the dry surface, and on recording, i.e. when the drop is removed from the wet surface by suction.

For a sample prepared according to Example III, with a time of exposure to the TUV lamp of 15 minutes per face and a time of constant with vinylpyrrolidone of 30 minutes, the following results are obtained:
angle of feeding: 105 degrees; angle on receding: 62 degrees.

For a sample prepared according to Example IV, with an exposure time of 5 minutes to HPK lamps, the following is obtained:
Angle on feeding: 90 degrees; Angle on receding: 10 degrees.

EXAMPLE VII

The same procedure is performed as in Example IV, except that vinylpyrrolidone is replaced with ethylpyrrolidone acrylate. For an UV exposure time of 5 minutes and a time of contact with the monomer of 30 minutes at 100° C., the grafting rate obtained is 8% by weight.

The study of the wettability of the material accomplished following the procedure described in Example VI leads to the following values:
Angle on feeding: 41 degrees; Angle on receding: 10 degrees.

EXAMPLE VIII

Lenses made of a graft copolymer of silicons and vinylpyrrolidone produced according to Example I are immersed for swelling in water, then exposed again to the radiation from a OZ4 mercury vapour lamp, radiating at 2537 angströms with a power of 3.5 W in that band. The lenses receive a radiation power of mW/cm$^2$ during 15 minutes on each face. The lenses obtained are stored in water. They are ready for use.

In the Examples hereinabove described the following advantages of the method of the invention have been emphasized: through this method, using simple and cheap means, easy to practice and to operate in mass production, it is possible to accomplish efficiently the grafting of a hydrophilic monomer onto a silicone resin and to produce an end material having good mechanical properties, which contains no filler, which is flexible and transparent and shows in the whole all the qualities required for contact lenses.

While the foregoing Examples have illustrated some of the embodiments of this invention, it is to be understood that various modifications and variations thereof will occur in the light of this invention to persons skilled in the Art and are to be included within the spirit and purview of this application and the scope of the appended claims.

I claim:

1. A method for preparing graft polyorganosiloxanes comprising an irradiating step, wherein an article previously moulded from a polyorgaosiloxane is subjected to a non ionizing UV radiation having a wave-length within the range from 1800 to 4000 Angströms in the presence of oxygen, the article being exposed to a power intensity of said radiation of about 100 to 1000 mw/cm$^2$ for a time period of about 5 seconds to 30 minutes and a subsequent grafting step wherein said article is contacted with a monomer selected from compounds having a pyrrolidone ring wherein the nitrogen atom of the heterocyclic ring carries as a substituent a hydrocarbon radical including an ethylenically unsaturated group, whereby said monomer is grafted onto the polyorganosiloxane.

2. A method according to claim 1, wherein said monomer is selected from monomers having hydrophilic properties.

3. A method as defined in claim 1 wherein said graft polyorganosiloxanes are ophthalmologically acceptable, whereby using said radiation having a wave-length of about 2,000 to 3,000 Angströms, the article is exposed to a power intensity of said radiation of about 100 to 1000 mW/cm$^2$ for a time period of about 5 seconds to 30 minutes, wherein said oxygen is present in the form of atmospheric air, wherein said unsaturated compound has hydrophilic properties, and wherein said grafting takes place in the substantial absence of oxygen.

4. A method according to claim 1, wherein said monomer is vinylpyrrolidone.

5. A method according to claim 1, wherein said polyorgaosiloxane is a cured composition as obtained from mixtures comprising siloxanic polymers the chains of which are terminated by vinyl groups and in which all silicon atoms are linked to two substituent aromatic or saturated aliphatic hydrocarbon radicals and further comprising an hydrogeno-organopolysiloxane comprising Si-H bonds in its formula.

6. A method according to claim 5, wherein the substituent radicals on each of said silicon atoms are two identical or different alkyl radicals having from 1 to 4 carbon atoms.

7. A method according to claim 1, wherein the dose of UV radiation received by the article processed corresponds to an energy within the range from 1 to 100 cal/cm$^2$.

8. A method according to claim 1, wherein said polyorganosiloxane is admixed with an agent efficient to limit the length of the chains formed in the grafting reaction.

9. A method according to claim 1, further comprising, subsequent to the grafting step a cross-linking step wherein the article is further exposed to an UV radiation.

10. A method according to claim 1, wherein the grafting reaction is effected by contacting the polyorganosiloxane with said monomer in the absence of oxygen at a temperature from 20° C. to 250° C., for a time period from 5 minutes to 8 hours.

11. A method according to claim 1, wherein said moulded article has the shape of a contact lens.

12. A method for preparing a contact lens adapted to be worn on the cornea comprising moulding a polyorganosiloxane composition into a substrate a generally concave-convex shape, irradiating said substrate in the presence of oxygen with a non ionizing UV radiation having a wave length within the range from 1800 to 4000 Angströms in the presence of oxygen, and contacting said irradiating substrate with a hydrophillic monomer selected from compounds having a pyrrolidone ring wherein the nitrogen atom of the heterocyclic ring carries as a substituent a hydrocarbon radical including an ethylenically unsaturated group to form a graft copolymer of about 75 to 99% by weight of said polyorganosiloxane composition and about 1 to 25% by weight of said monomer grafted thereto.

13. A method according to claim 12, further comprising further irradiating said graft copolymers to cross-link said monomer units, said further irradiating being of sufficient intensity and duration to cause a sufficient amount of cross-linking of said monomer units to substantially reduce the risk of rupture of a precorneal lachrymal film, while said graft copolymer remains capable of being rendered transparent and has the optical properties necessary to function as a contact lens.

14. Articles and contact lenses made of a graft polyorganosiloxane produced by the method according to claim 1.

* * * * *